Aug. 21, 1923.

F. KLEIN 1,465,554

BRAIDING MACHINE

Original Filed April 15, 1920    6 Sheets-Sheet 3

Inventor
Frederick Klein

By Davis Davis
Attorneys

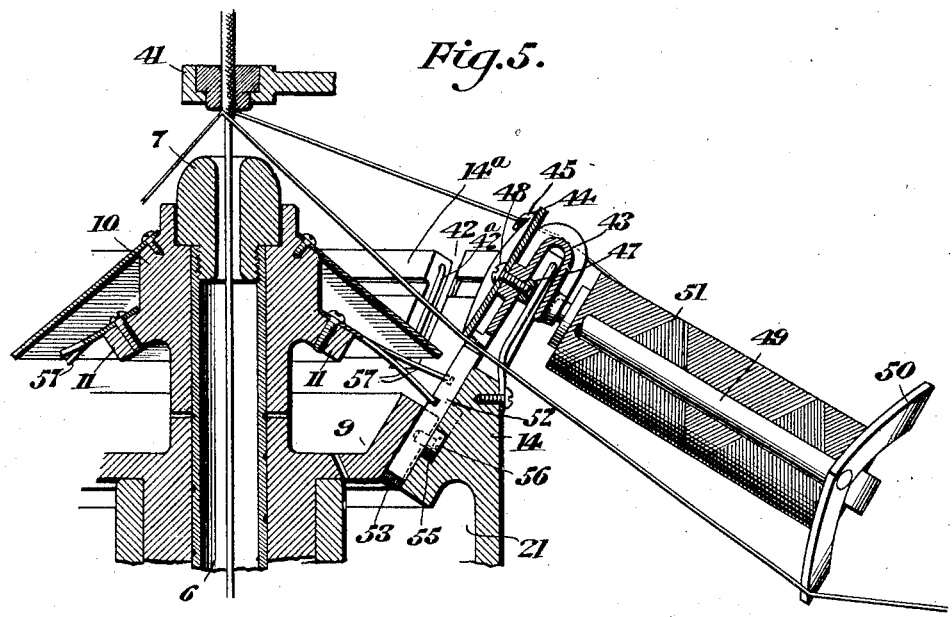
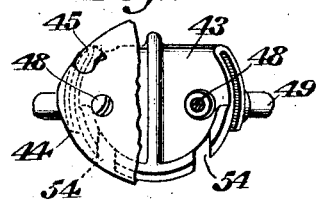
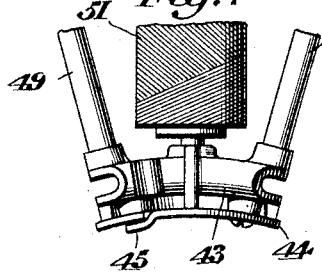
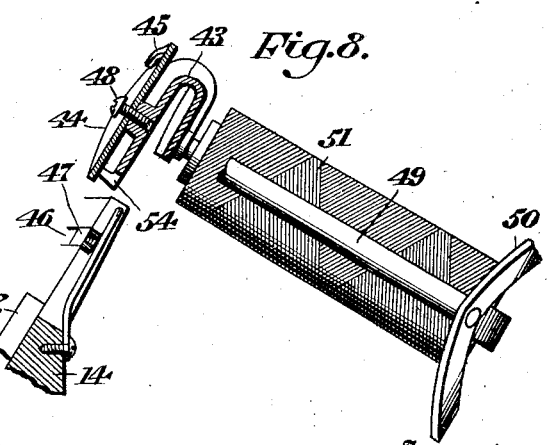

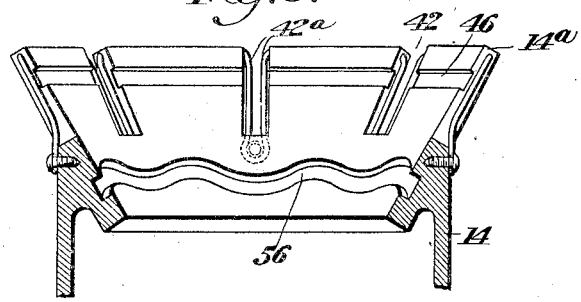
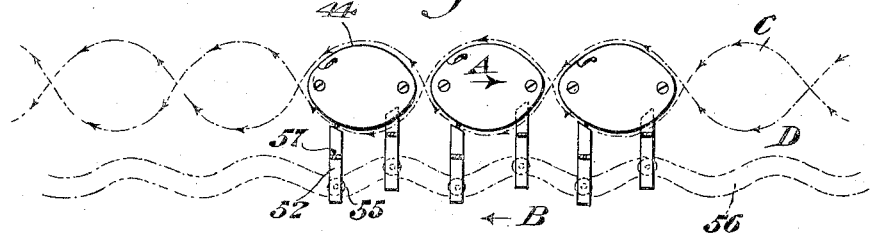
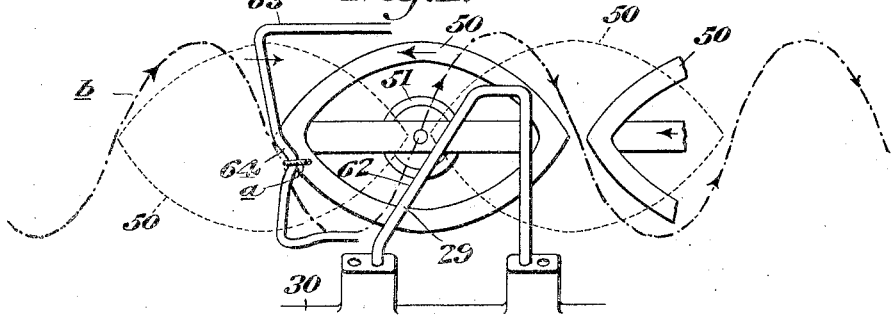
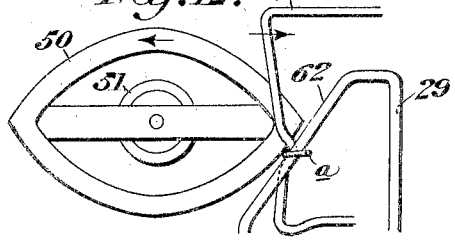
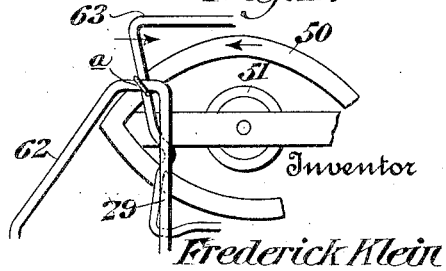

Aug. 21, 1923.

F. KLEIN 1,465,554

BRAIDING MACHINE

Original Filed April 15, 1920    6 Sheets-Sheet 6

Inventor
Frederick Klein

By *Davis Davis*
Attorney

Patented Aug. 21, 1923.

1,465,554

UNITED STATES PATENT OFFICE.

FREDERICK KLEIN, OF NEW YORK, N. Y., ASSIGNOR TO NATIONAL INDICATOR COMPANY, OF LONG ISLAND CITY, NEW YORK, A CORPORATION OF NEW YORK.

BRAIDING MACHINE.

Application filed April 15, 1920, Serial No. 374,222. Renewed January 31, 1921. Serial No. 441,457.

*To all whom it may concern:*

Be it known that I, FREDERICK KLEIN, a citizen of the United States, and resident of the borough of Manhattan, city, county, and State of New York, have invented certain new and useful Improvements in Braiding Machines, of which the following is a specification.

This invention relates to that type of machines in which two oppositely rotating tables or turrets are provided, each turret or table carrying a series of spools or bobbins, the threads from all of said spools converging at a braiding point above the machine and means being provided whereby the threads from one series of bobbins will be interlaced with the threads from the other series of bobbins. The purpose of machines of this type is to produce a tubular braided fabric with or without a core. Such machines are largely for braiding coverings on electric wires; but of course it will be understood that they are capable of a great variety of uses.

One of the main objects of this invention is to produce a machine having few moving parts and wherein the threads are guided by relatively fixed guiding arms or cams, whereby the use of all reciprocating thread-guiding means is avoided.

Another important object of the invention is to so construct the machine that the moving parts will be concentrated as close as possible to the center or axis of rotation.

Another object of the invention is to suspend one series of bobbin carriers at their upper inner ends so that said carriers will extend outwardly and downwardly at the angle they would naturally assume due to the speed of rotation of the carriers around the machine. The object of this construction is to reduce to the smallest possible degree the friction of the said carriers on their supporting means.

Another object of the invention is to provide a series of stationary thread guides so positioned that they serve as means to divert the threads from one set of bobbins over and under the threads from the other set of bobbins, said guides being adjustable around the machine in order to vary the paths of the threads. The purpose of this construction is to permit the machine to be adjusted for producing braiding effects of different characters. By adjusting the cams each of the threads from the outer series of bobbins may be caused to pass over two threads of the inner series of bobbins and then under two of such threads; or they may be adjusted to cause each of the threads from the outer series of bobbins to pass over one thread and then under one thread. Any other desired arrangement of cams may be made to secure other braiding effects.

Another object of the invention is to provide a novel means for causing the inner set of bobbin carriers to move about the machine while at the same time permitting the interweaving of the threads from the two series of bobbins. This means consists of reciprocating pins which are adapted to be brought into and out of engagement with the carrier heads, and flexible resilient elements connected to said pins to aid them to vibrate, or reciprocate, and thereby relieve the pin-actuating means from the effects of inertia.

There are other objects and advantages of the invention which will hereinafter appear.

In the drawings:

Fig. 1 is a plan view of the machine;

Fig. 2 a vertical central sectional view thereof;

Fig. 3 a sectional view of the lower part of the machine taken on the line III—III of Fig. 1;

Fig. 4 a detail front elevation of the base of the machine the cover-plate of the change-gear box being removed;

Fig. 5 a detail vertical sectional view of the upper part of the rotating turrets;

Fig. 6 a detail view of the upper end of the inner set of carriers, the end guide plate or head being broken away;

Fig. 7 a detail plan view of the parts shown in Fig. 6;

Fig. 8 a detail side elevation partly in section of one of the suspended carriers and its guiding track;

Fig. 9 a detail sectional view of the guiding track carried by the outer turret;

Fig. 10 a diagrammatic view showing the means for connecting the inner series of carriers to the inner turret and also showing the path of the thread around the heads of said carriers;

Fig. 11 a diagrammatic view showing the shuttles secured to the outer ends of the inner series of carriers and also showing the path of the thread around said shuttles, and the thread guiding means;

Figs. 12 and 13 show the shuttles and guide of Fig. 11 in two positions;

Fig. 19 a detail view of one of the outer bobbin-carrying brackets.

Figure 1:
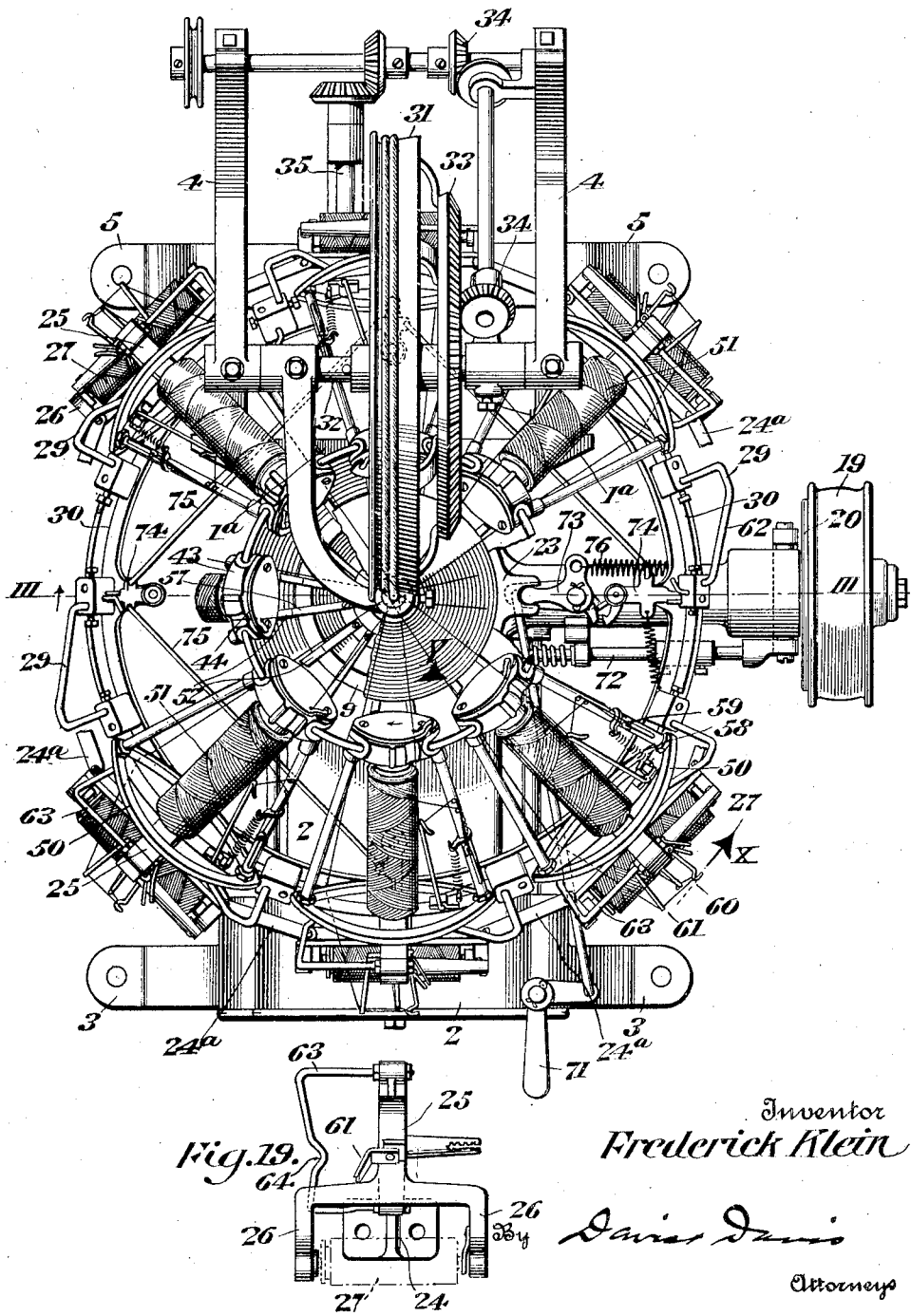

Referring to the various parts by numerals, 1 designates the base of the machine which is supported by a forwardly projecting member 2 carrying supporting legs 3. The supporting member 2 is formed at its front end with a chamber adapted to receive the change gears, as will be more fully hereinafter described. The base is also supported by rearwardly and upwardly extending arms 4 which are mounted near their lower ends on supporting legs 5. The lower ends of the arms 4 are suitably bolted to the rear part of the base 1ª, as shown in Fig. 1. The base 1 is hollow, and centrally mounted therein is an upwardly extending tubular rigid post 6, on the upper end of which is rigidly secured a terminal 7. When the machine is used for braiding a covering over a core, such as an electric wire, the core passes upwardly through the tubular post 6.

Figure 2:
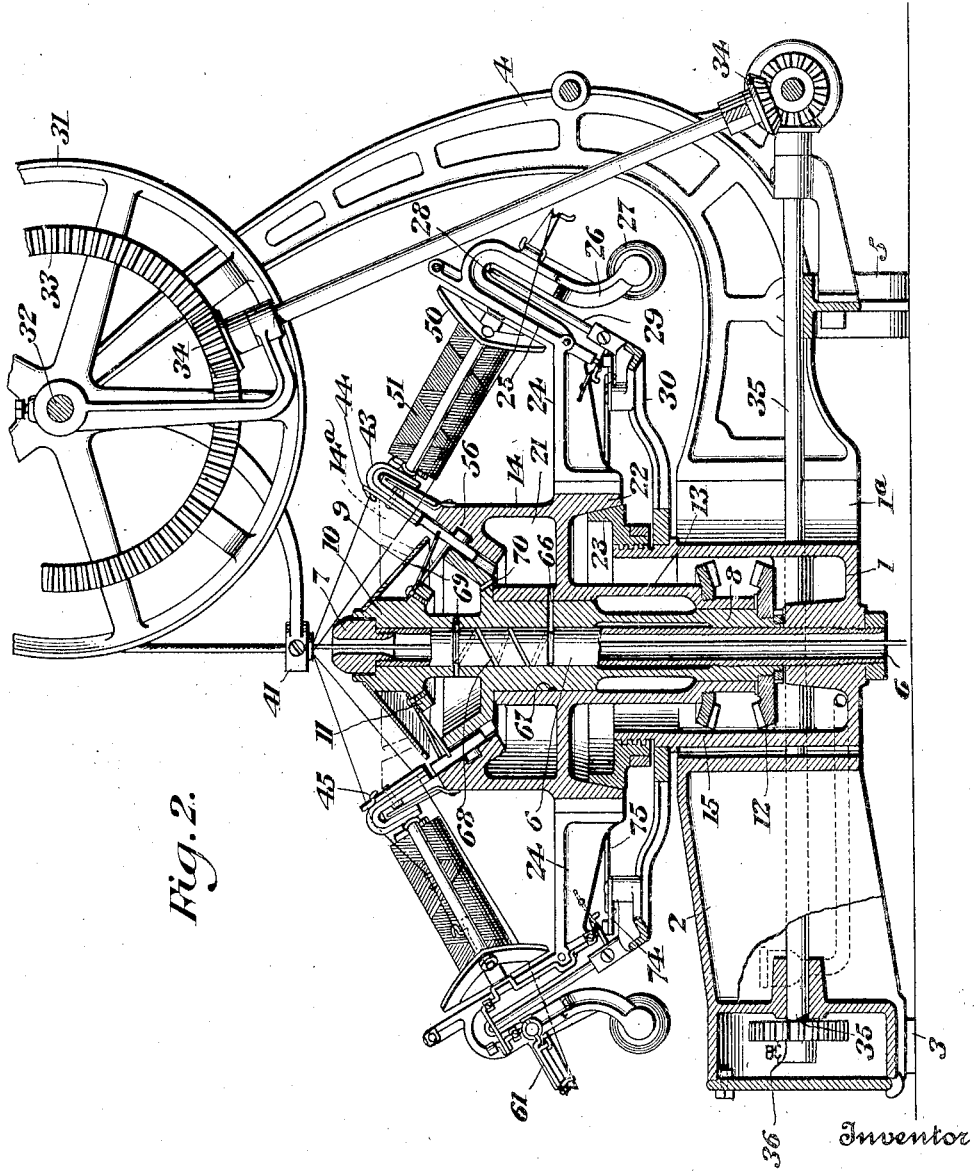
Figure 3:
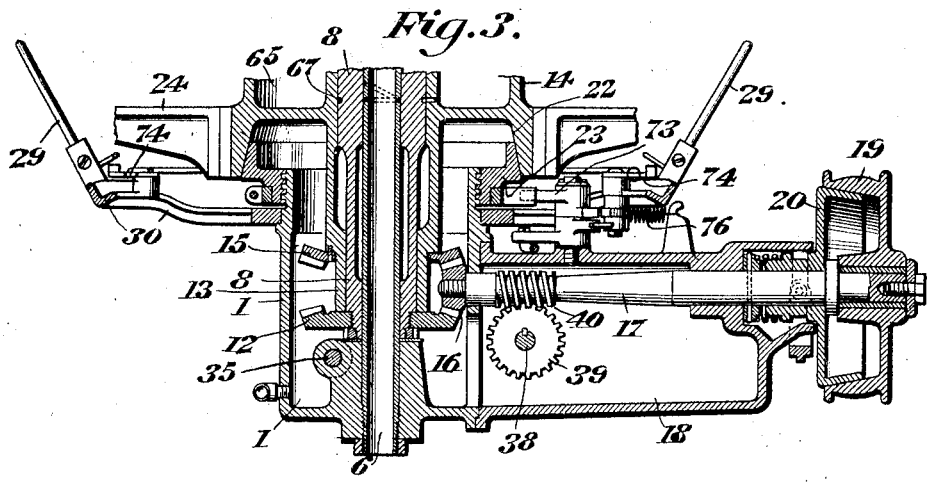
Figure 4:
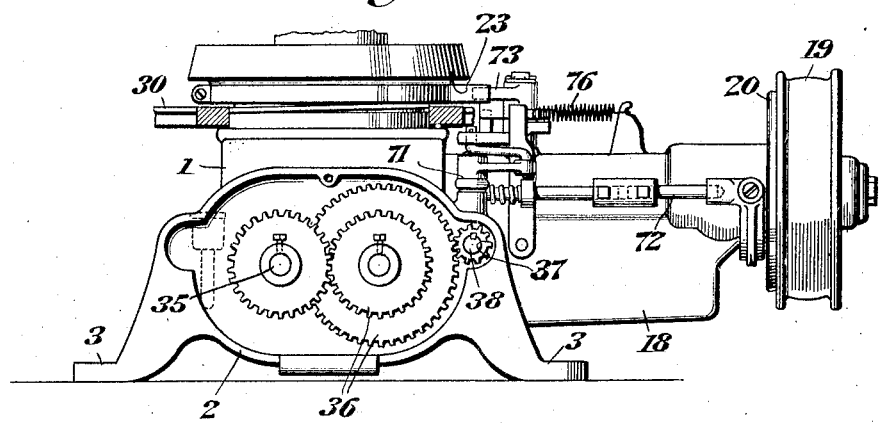

Mounted to rotate on the post 6 is a sleeve 8 and on the upper end of this sleeve near the upper end of the post is formed a turret or head 9. This head is dished and the outer wall thereof inclines upwardly and outwardly. Above the turret 9 the sleeve 8 is formed with a head 10 which carries at its lower end the outwardly and downwardly inclined annular flange 11, said flange being above the upper edge of the outer wall of the dished turret 9. The lower end of the sleeve 8 extends into the hollow base and has rigidly secured to it within the base a beveled gear 12 through which gear rotary motion is imparted to the sleeve and to the turret 9. Mounted on the sleeve 8 is an outer sleeve 13 which carries at its upper end the outer larger turret 14. This turret at its upper end is also dished, the inner surface of the dished portion extending close to the outer surface of the dished portion of the inner turret 9 and inclining inwardly and downwardly parallel with the outer surface of the said inner turret, as shown clearly in Figs. 2 and 5. The upper portion of the turret 14 inclines upwardly and outwardly beyond the exterior surface of the main portion of the turret, said upwardly and outwardly extending portion forming a guiding and supporting track for the inner series of carriers, said carriers being suspended at their upper ends on said track and extending from said track outwardly, as will be more fully hereinafter described. The lower end of the sleeve 13 extends within the hollow base and carries therein a beveled gear 15 through which rotary motion is imparted to the said sleeve and to the turret 14. The gear 15 is arranged above the gear 12, and engaging both of said gears is a beveled pinion 16, this latter pinion being mounted on a horizontal drive shaft 17. Shaft 17 is mounted in suitable bearings in a supporting member 18 and is provided on its outer end with a loose driving pulley 19. On the outer end of the drive shaft is arranged a clutch 20 which is adapted to be brought into engagement with the driving pulley 19 when it is desired to operate the machine. This clutch operating means will be more fully hereinafter described. It is to be noted that the sleeves 8 and 13 with their turrets will be driven in opposite directions. The turret 14 below the dished portion thereof is hollow and forms an oil chamber 21. Below the oil chamber 21 the turret 14 is formed with a depending annular flange 22 which is outwardly and downwardly beveled on its inner surface to receive a correspondingly beveled brake-ring 23. To the outer surface of the flange 22 are secured outwardly extending radial brackets 24 which carry the outer series of bobbins. There are preferably eight of these bobbin-supporting brackets, but it will, of course, be understood that the number of brackets may be varied as desired. Each bracket is formed with an upwardly and outwardly inclined arm 25, said arm being parallel with the inclined inner surface of the dished part of the turrets. Each of said upwardly extending arms is provided with an outwardly and downwardly extending bobbin support yoke 26, the bobbins 27 of the outer series being journalled in the lower ends of the arms of these yokes. The arms 26 of the bobbin-carrying brackets 24 are connected together around the machine by rigid links 24ª, the object being to brace said brackets and prevent any lateral shifting or twisting of individual brackets due to the high speed of the machine. Between the arms of the yoke and the upwardly extending arm 25 is formed a channel or passage 28 which is adapted to receive stationary thread guides 29, which are mounted on an annular supporting frame 30, this latter frame being rigidly secured to the base 1. The thread guide cams 29 incline upwardly and outwardly and are parallel with the upwardly and outwardly inclined arms 25, and of course, are parallel with the inclined surfaces of the turrets 9 and 14. As the turret 14 is rotated the thread-guiding cams 29 pass through the channels 28.

A take-up drum 31 is mounted on a shaft 32 journalled in the upper ends of the arms 4, this take-up drum receiving the braided material and drawing it upwardly from the braiding point. The take-up drum is provided with a large beveled gear 33 which is driven through a train of gears 34 which gears receive motion through shaft 35 and the gears 36 in the change-gear box. The change gears are driven through pinion 37 mounted on a shaft 38 which shaft carries a worm gear 39 meshing with a worm 40 on the main drive shaft. By selecting proper gears, the take-up drum may be driven at the desired speed. A tubular guide 41 is supported by the arms 4 and is designed to maintain all of the threads converging at the proper braiding point. As shown in the drawings, this tubular guide is arranged a short distance above the terminal 7 of the central rigid post 6.

The upwardly and outwardly extending track portion 14ª of the turret 14 is slotted, as at 42. As shown in the drawings, this turret is formed with eight slots, one slot for each of the eight bobbin carriers of the outer series. In the slots 42 are arranged guard wires 42ª. These guard wires are slightly offset from the walls of the slot and serve to keep threads of the outer bobbins from contacting with the slot walls. Oil may creep up the inner wall of the turret 14 and lodge in the slots and it is to prevent the threads from contacting with the oily walls of the slots that the guard wires are employed. On the supporting and guiding track 14ª are mounted heads 43 of the inner series of carriers. These heads are in the form of yokes and are adapted to fit down over the guiding track, the said track being received between the inner and outer members of the yoke. The guiding track 14ª is tapered slightly on its outer side so that the upper end of the track is slightly thinner than the lower end thereof and the inner surface of the outer arm of the yoke 43 is correspondingly inclined to receive the inclined outer surface of said track. Each head has secured to its inner surface and within the dished part of the turret 14 a substantially elliptical thread-guiding plate 44, and said plate is formed with a lip or finger 45 which serves as a thread pass. The inner surface of the supporting and guiding track 14ª is formed with an annular groove 46, and each carrier head 43 is provided with a guide key 47, which is adapted to fit and slide in said groove 46. Each guide key is secured to the head by means of two screws 48, said screws also serving to secure the guide plates 44 to the heads. When the keys are secured in position they serve as means to lock the carrier heads to the supporting and guiding track 14ª. The guide plate 44 is slightly larger than the heads 43 so that they serve effectively to guide the threads from the outer series of bobbins and prevent them engaging the heads 43. To each head 43 is secured two outwardly extending and downwardly inclined rods 49. These rods diverge outwardly from each other and their outer ends are rigidly secured to the large rigid head 50 which serves as a shuttle, said head being substantially elliptical in form with its longer axis horizontal and its ends somewhat pointed. This shuttle supports one journal of the bobbin 51, the other journal of said bobbin being supported in the head 43, as shown clearly in Figs. 5 and 8 of the drawings. The outer surface of the shuttle 50 lies close to the inner side of the upwardly extending arms 25, as shown clearly in Fig. 2, and the center of said shuttle is slightly below the upper ends of the stationary thread-guiding cams 29. The threads from the inner series of bobbins 51 pass under the guiding fingers 45 and thence directly to the braiding point.

The carrier supporting heads 43 are supported and guided on the track 14ª but they are moved around the machine by the turret 9, and, therefore, moved in a direction opposite to the rotation of the turret 14 and track 14ª. To cause these carriers to move with the turret 9 they are connected to said turret by means of sliding coupler pins 52. There are two of these pins for each carrier head 43 and said pins slide in grooves 53 formed in the outer surface of the turret 9, said grooves forming the means for locking the pins to the turret 9 and causing them to rotate therewith. The pins 52 are adapted to enter notches 54 formed in the lower edges of the heads 43, there being two of said notches in each head, one for each of the coupling pins. Each coupling pin is provided with a roller 55, which is adapted to travel in an annular undulating groove 56 formed in the inner surface of the turret 14, said groove being located below the slots 42. It is manifest that as the pins move around the machine with the turret 9 they will be reciprocated and brought into and out of engagement with the notches 54 in the carrier heads. The groove 56 is so shaped that the coupler pins will be withdrawn one at a time from the carrier heads as they each reach one of the slots 42 and will be projected back into engagement with the carrier head as they reach a point just beyond the slots, so that the coupler pins will alternately "let go and take hold" of the carrier heads as they pass each of the slots 42. The purpose of this is to permit the threads from the outer bobbins to pass under the heads of the inner series of bobbins. The threads from the outer bobbins move in and out in the slots 42 and pass either over or under the heads 43, as will be more fully hereinafter described.

In order to reduce the stress on the rollers 55 on the walls of the groove 56, each coupler pin is mounted on the outer end of a resilient element 57, the other end of said resilient element being rigidly secured to the flange 11 of the turret head 10. These resilient elements are flexed by the movement of the coupler pins and spring back when released and thereby set up a vibratory movement in the coupler pins. The vibration of the coupler pins due to the flexing of the resilient elements and the inherent tendency of said elements to return to normal, will materially decrease the friction between the rollers 55 and the curved walls of the groove 56.

The resilient elements 57 are designed to have a speed of vibration synchronous with the movements imparted to the coupler pins by the curved groove 56. If, therefore, the elements and their attached coupler pins were free to vibrate, air resistance and friction being eliminated, the said elements and coupler pins would continue to vibrate precisely as if they were given vibrating impulses by the walls of the curved groove 56. When the machine is operating at its designed speed and the vibrations are set up in the resilient element the walls of the groove will be relieved of the major portion of the wear which would be caused by alternately accelerating and retarding the movement of the pins as they move toward and beyond mid-position, and the engagement between the rollers 55 and the walls of the groove 56 will be very light and only sufficient to overcome the friction of the pins and the air resistance. The effect of the gravity of the coupler pins on the resilient elements will be eliminated or greatly reduced, owing to the inclination of the interior wall of the turret 14, on which said pins reciprocate, and to the speed of rotation of the turret 9. The coupler pins move in a path perpendicular to a line which the resilient elements would assume if said elements and the coupler pins were freely suspended and permitted to assume a position due to the centrifugal force of the rotating turret 9. The resilient elements, when at rest, are designed to lie in said line, and, when flexed, to move a uniform distance above and below said line.

By mounting the coupler pins on the resilient elements the work of reciprocating said pins is transferred to the springs and the roller and the operating cam-groove are relieved of practically all of the wear. If the springs break or become worn, they may be readily removed and new ones replaced, so that the wear of the parts is transferred to an element which is readily replaceable without in any way dismantling the machine. Should any of the springs break the machine is entirely operative and may be run until it is desired to replace the broken parts. It is manifest that if the groove and rollers were relied upon as the sole means for reciprocating the pins, there would be a great deal of wear on these parts as the machine is designed to operate at a very high speed, and it is very important that the moving parts be relieved, as far as possible, of wear.

There is sufficient lost motion in the connections between the resilient elements and the coupler pins to prevent any binding or buckling of the resilient elements when in their normal or straight-out position. This straight-out position is the zero point in the vibration of the elements and is midway between the limits of the vibrating movement of said elements.

Wherever the speed of vibration of the resilient elements varies above or below the required number of vibrations of the coupler pins, this variation will be corrected by the impulses given to the coupler pins by the groove 56. In practical operation of this machine the resilient elements materially reduce the frictional resistance between the coupler pins and their actuating groove and a very high speed can be maintained with inconsiderable friction in the groove 56. In Fig. 10 is diagrammatically illustrated the coupler pins and the manner of connecting and disconnecting them from the heads of the carriers. The paths of the threads around the coupler heads and past the coupler pins are also diagrammatically illustrated. It will be noted that one pin of each pair is disconnected from the carrier head to permit the thread to pass, the other pin being engaged in the carrier head and locking the carrier to the turret 9. It will, of course, be understood that the carriers are moving in the direction indicated by the arrow A, while the groove 56 is moving in the direction indicated by the arrow B. The threads from the outer series of bobbins pass over and under the carriers as indicated by the arrows C and D. As they pass under the carrier heads the coupler pins "let go and take hold," as hereinbefore described, but at no time are the carrier heads completely released from both coupler pins.

The inner series of carriers are suspended from the guiding track 14$^a$ at such an angular position that the axis of the bobbin inclines at approximately 60° from the vertical axis of the rotating turrets. This is the angle approximately which these carriers would assume if they were freely suspended at the axis of the turrets and free to swing and take a position which would be the resultant of centrifugal and gravitational forces in the manner of governor balls. When the carriers are at rest their outer ends drop slightly causing the carrier heads to bind slightly on the guiding track. When the machine is rotating at normal speed the outer ends of the carriers will lift due to the centrifugal force and thereby relieve the binding of the carrier heads on the track, so that when the turrets are rotating at normal speed the carriers will freely move in the guiding and supporting track without any binding action. This is important as it materially reduces the friction of the carrier heads on their guiding track. As the carriers are light and as the diameter of the turret 14 and guide track 14ª is small the friction of the carrier heads on the guide track due to the centrifugal force will be very slight.

The thread from the bobbins 51 is passed around a tension device 58 and a thread-break stop 59, both of these devices being mounted on the carrier and traveling with the bobbin. As these devices form no part of the present invention, they will not be specifically described or claimed in this application. It will, of course, be understood that any suitable thread tension and thread-break stop device may be employed in this machine.

The bobbins 27 are suspended between the arms of the yoke 26 with their axes horizontal. The thread from each of these bobbins 27 is led through a tension device 60 and a thread-break stop 61 and thence to the braiding point. These tension devices and thread-break stops are mounted upon the yokes 26 and, of course, travel with the bobbins and their supporting means. As these devices will not be claimed in this application, they will not be specifically shown or described herein.

Figure 16:
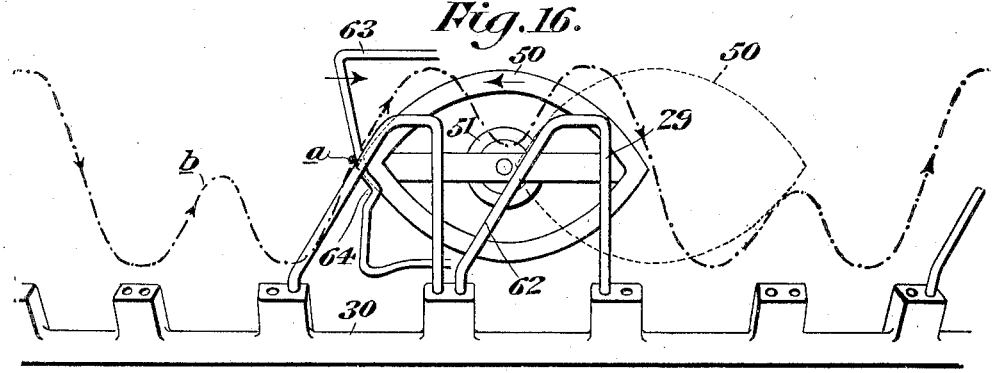
Fig. 16 is a diagrammatic view showing the thread guide cams arranged to produce a "two over and two under" character of braiding, (whip lash)
Figure 17:
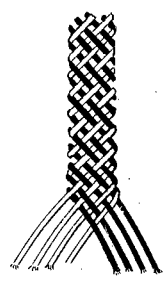
Figs. 17 and 18 are diagrammatic views showing the character of braiding produced by the arrangement of cams shown in Fig. 16.
Figure 18:
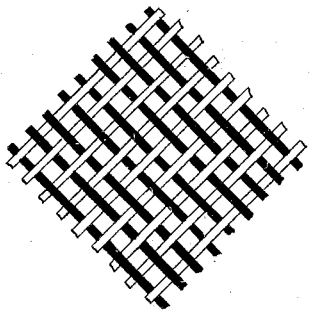

The stationary thread guides 29 are provided with the inclined cam portions 62 which extend upwardly and outwardly in the direction of rotation of the outer series of carriers, said carriers being designed to rotate in the direction indicated by the arrow X in Fig. 1. These cam guides are formed of bent wire, their inwardly and downwardly extending members being adapted to enter sockets in the supporting ring 30. The supporting ring is formed with a series of apertures so that the cams may be adjusted along said ring to the desired positions for properly guiding the threads from the outer series of bobbins. As shown in Figs. 1 and 16, the supporting ring is provided with apertures arranged in pairs so that the thread guiding cams may be arranged singly, as shown in Fig. 1, or in pairs, as indicated in Fig. 16. When arranged, as shown in Fig. 1, the threads from the outer bobbins will be guided over and under each thread of the inner series of bobbins. When arranged, as shown in Fig. 16, they serve to guide the threads from the outer bobbins over two threads from the inner series of bobbins, and then under two threads from the said series. Suitable clamp screws are provided to secure the cam guides 29—62 in their adjusted positions. As hereinbefore pointed out, the passages or channels 28 in the brackets which support the bobbins 27 receive the guide cams 29 so that the bobbins 27 may be located below the guide cams and said cams will serve to guide the threads over the shuttle 50 on the outer ends of the inner series of carriers.

Each carrier bracket 24 is provided with a thread guiding arm 63 which is formed with a notch 64, through which the thread passes from the tension device and thread-break stop to the braiding point. This thread guide is located at the rear end of each carrier considered with respect to the direction of movement of the carriers around the machine. The notch 64 is located at a point slightly below the horizontal center of the shuttles 50 so that normally the thread lies in said notch and in position to be engaged by the lower curved edge of the shuttle. When the threads from the outer carriers are engaged by the inclined portion 62 of the cam guides, they are lifted out of the notch 64 as indicated in Figs. 13 and 16, and are then free to travel up over the shuttles. As soon, however, as the shuttle has passed beyond a thread it drops down into the notch 64 and will be presented to the under side of the next advancing shuttle, or if it engages a cam guide 62, it will be again lifted out of said notch and will be presented to the upper surface of the next advancing shuttle. As the thread guide 63 maintains a fixed position with respect to its associated carrier, the thread will normally always lie in the notch 64 and will be diverted out of said notch only by the inclined surfaces 62 or by the lower edges of the shuttles. When the thread is released and free to assume its normal position on the guide 63, it will return to the notch 64 slightly below the ends of the shuttles 50. It is necessary that the notch 64 be slightly below the horizontal center of the shuttle in order to assure the thread passing below the shuttle when said thread is free of the guide cams 29.

The operation of the turrets and carriers may be briefly described as follows:

The turrets 9 and 14 rotate in opposite directions, the turret 14 rotating in the direction indicated by an arrow X and the turret 9 rotating in the direction of the arrow Y in Fig. 1. The ring 30 supporting the cam guides 29 is stationary. As the outer series of carriers move around the machine the threads extending therefrom engage the inclined portions 62 of the cam guides and are raised above the point of the shuttle 50 of the inner series of carriers. As the threads move up the inclined part 62 they are engaged by the upwardly curved upper edge of the shuttle and passed up over the shuttle. As the shuttle advances, the thread passing over it will drop down beyond the cam guide which has just operated upon it. In the arrangement of cam guides shown in Figs. 1 and 11, the thread will drop down below the point of the next advancing shuttle and will engage the downwardly curved lower side of said advancing shuttle and be carried under said shuttle. It will, of course, be understood that as the threads from the outer bobbins are carried over and under the shuttles they pass over and under the threads from the inner series of bobbins. After passing under one shuttle a thread will engage the inclined surface 62 of the next cam guide and will be by it deflected or raised above the next advancing shuttle, and so on completely around the machine. The threads from the outer series of bobbins pass upwardly through the slots 42 to the braiding point, and the carrier heads of the inner series of carriers are moved across said slots through the operation of the coupler pins which, as hereinbefore described, are reciprocated to "let go and take hold" of the carrier heads as said coupler pins pass across said slots. By this means the threads from the outer series of carriers are permitted to pass under the carrier heads when they are passing under the shuttle. Of course, when the said threads pass over the shuttles they also pass freely over the carrier heads 43. It is manifest that when the threads pass under the carrier heads they likewise pass under the threads from the inner series of carriers, as these threads extend from the guide fingers 45 to the braiding point.

In Fig. 11 $a$ indicates a thread from one of the outer series of bobbins. It is engaging notch 64 in the thread guide 63, and the shuttle 50 of one of the inner series of bobbins is advancing to meet said thread and divert it under the shuttle. As the thread and the shuttle are moving in opposite directions the shuttle will have advanced to the position shown in full lines in Fig. 12 and in dotted lines in Fig. 11 by the time the thread $a$ has reached the part 62 of the guide cam 29, at which time the thread $a$ has passed under the shuttle. As the thread guide 63 and the thread $a$ continue their movement toward the right, the thread $a$ will be moved by the inclined surface 62 out of the notch 64 and raised sufficiently to be engaged by the upper curved surface of the next advancing shuttle. This operation is shown in dotted lines in Fig. 11 and in full lines in Fig. 13, so that the thread $a$ in the arrangement of cam guides 29 shown in Figs. 1 and 11, will travel, as indicated in the black dotted line $b$ of Fig. 11.

In Fig. 16 the cam guides 29 are arranged in groups of two with a blank spaced between each group. In this arrangement the thread $a$ will engage two cams 29 before it is permitted to drop back into the notch 64 so that the threads $a$ will pass over two of the threads of the inner series of bobbins before they are permitted to pass under said threads. By providing the blank spaces in between the series of cam guides 29 the thread $a$ will be forced to pass under two of the threads from the inner series of bobbins before it is again engaged by a cam guide 29 and diverted above the shuttle 50.

Figure 14:
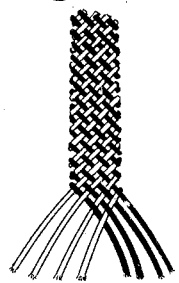
Figs. 14 and 15 are diagrammatic views showing the character of braiding produced by the arrangement of cams shown in Figs. 11, 12 and 13 (basket braid)
Figure 15:
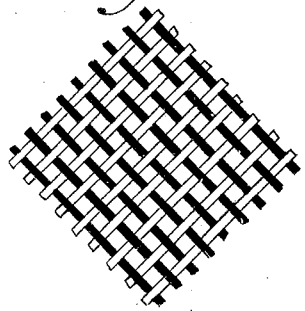

Figs. 14 and 15 illustrate the (basket braid) type of braiding produced by the arrangement of cam guides shown in Figs. 1 and 11, and Figs. 17 and 18 illustrate the (whip lash) type of braiding produced by the arrangement of cam guides shown in Fig. 16.

An oil port 66 leads from the bottom of chamber 21 to a groove 67 in the sleeve 8. This groove communicates through radial ports to the spiral oil groove 68 in the post 6. The upper end of this spiral groove communicates with ports 69 which extend through the sleeve 8 into the cup formed by the dished turret 9. Through the bottom of this turret 9 a port 70 is formed which leads back into the chamber 21. In the hollow base 1 a supply of oil is maintained to provide lubrication for the gears and for the lower ends of the sleeves.

The machine is started and stopped by means of a handle 71 which is connected through suitable rods to a clutch-operating rod 72. This clutch-operating means is connected through a bell crank lever 73 to a brake ring 23 so that when said clutch means is operated to stop the machine the clutch ring will be slightly rotated and, through its threaded connection with the base, raised into engagement with the cooperating base of the turret 14. A series of thread-brake stop fingers 74 are provided on the rigid ring 30 in position to be engaged by the thread-break stop devices mounted on the carriers. These thread-break stop fingers are connected together by rods 75, and one of the stop fingers 74 is connected to the clutch operating mechanism. A spring 76 serves to operate the clutch mechanism and also to rotate the brake ring whenever the thread-break stop devices are operated. These devices are not claimed herein and it is thought unnecessary to more particularly describe and show them. It will, of course, be understood that any suitable form of clutch mechanism may be employed to connect the driving shaft with the loose pulley 19.

What I claim is:

1. A braiding machine comprising a base, a central rigid post mounted therein, a sleeve rotatably mounted on said post and carrying an inner turret at its upper end, an outer turret mounted to rotate on said sleeve, the upper part of said outer turret forming a guiding and supporting track, an inner series of carriers mounted on said track and extending outwardly and downwardly therefrom, means carried by the inner turret to intermittently connect the inner series of carriers thereto, an inner series of thread bobbins mounted on the inner series of carriers, an outer series of thread bobbins carried by the outer turret, a series of stationary thread guides adapted to engage the threads from the outer series of bobbins and guide them over the bobbins of the inner carriers, and means for rotating the turrets in opposite directions.

2. A braiding machine comprising a base, a central rigid post mounted therein, an inner turret mounted on said post, an outer turret, the upper end of said outer turret extending upwardly and outwardly to form a guiding and supporting track, an inner series of carriers mounted on said track and extending outwardly and downwardly therefrom, means for intermittently connecting said carriers to the inner turret and to permit threads to pass under said carriers, a series of thread bobbins mounted on the inner series of carriers, a series of thread bobbins mounted on the outer turret, a series of stationary thread guides between said outer bobbins and the inner series of carriers and adapted to cause the threads from the outer bobbins to pass over the inner series of carriers, rigid thread guides mounted on the outer turret and moving with the outer series of bobbins and normally directing the threads from said bobbins under the inner series of carriers, and means for rotating the turrets in opposite directions.

3. A braiding machine comprising a base, an inner turret having an upwardly and outwardly inclined outer face, an outer turret surrounding said inner turret and formed with an upwardly and outwardly inclined guiding track at its upper end, said track being radially slotted, a series of carrier heads mounted on said track, a series of bobbins supported by said carrier heads and extending outwardly and downwardly therefrom, a series of coupler pins adapted to intermittently connect the carrier heads with the inner turret to cause them to travel therewith, means for reciprocating said pins to cause said pins to "let go and take hold" of said carriers as the pins pass the slots in the supporting and guiding track, a series of bobbins carried by the outer turret the threads from said outer bobbins passing through the slots in the guiding track, means for causing the threads from the outer series of bobbins to pass over and under the inner series of bobbins, and means for rotating the turrets in opposite directions.

4. A braiding machine comprising a base, an inner turret having an upwardly and outwardly inclined outer face, an outer turret surrounding said inner turret and formed with an upwardly and outwardly inclined guiding track at its upper end said track being radially slotted, a series of carrier heads mounted on said track, a series of bobbins supported by said carrier heads and extending outwardly and downwardly therefrom, a series of coupler pins adapted to alternately connect the carrier heads with the inner turret to cause them to travel therewith, means for reciprocating said pins to cause said pins to "let go and take hold" of said carriers as the pins pass the slots in the supporting and guiding track, a series of bobbins carried by the outer turret the threads from said outer bobbins passing through the slots in the guiding track, means for causing the threads from the outer series of bobbins to pass over and under the inner series of bobbins, means for rotating the turrets in opposite directions, and resilient elements connected to the coupler pins and to the inner turret.

5. A braiding machine comprising a base, an inner turret, an outer turret, means for rotating the turrets in opposite directions, a series of bobbin carriers mounted on the outer turret, coupler pins rotating with the inner turret, means for vibrating said pins to connect them and disconnect them from the carriers mounted on the outer turret, whereby the said carriers will move with the inner turret, and resilient elements connected to the coupler pins and to the inner turret.

6. A braiding machine comprising a base, an inner turret, an outer turret, means for rotating the turrets in opposite directions, an inner series of bobbin carriers slidably mounted on the outer turret, an outer series of bobbin carriers rigidly mounted on the outer turret and rotating therewith, coupler pins rotating with the inner turret, means for vibrating said pins to connect them and disconnect them from the bobbin carriers mounted on the outer turret, whereby the said carriers will move with the inner turret and the pins will permit the threads from the outer series of bobbins to pass under said carriers, and resilient elements connected to the coupler pins and to the inner turret.

7. A braiding machine comprising an inner turret, an outer turret, means for rotating the turrets in opposite directions, a series of bobbin carriers mounted to slide on the outer turret, a series of outer bobbin carriers fixed to the outer turret and rotating therewith, coupler pins rotating with the inner turret, an undulating groove formed in the outer turret, means connected to the coupler pins and operating in said groove to reciprocate said pins to connect and disconnect them from the slidable carriers mounted on the outer turret, whereby the said slidable carriers will move with the inner turret and the coupler pins will permit the threads from the outer series of bobbins to pass under said slidable carriers, and resilient elements connected to the coupler pins and to the inner turret, the resilient elements being tuned to vibrate in synchronism with the undulations of the said groove in the outer turret.

8. A braiding machine comprising an inner turret, an outer turret, means for rotating the turrets in opposite directions, a series of bobbin carriers mounted to slide on the outer turret, a series of outer bobbin carriers fixed to the outer turret and rotating therewith, coupler pins rotating with the inner turret, means for imparting reciprocating impulses to the coupler pins, and resilient means connected to said coupler pins and adapted to vibrate and thereby maintain the reciprocating impulses imparted to the coupler pins, said pins operating to connect and disconnect the slidable carriers to the inner turret and permitting the threads from the outer series of bobbins to pass under said carriers.

9. A braiding machine comprising a series of bobbin carriers, a guiding and supporting track on which said carriers are adapted to move, a rotating means, coupler pins carried by said rotating means, means for imparting reciprocating impulses to the coupler pins, and resilient means connected to said coupler pins and tuned to synchronize with said reciprocating impulses and thereby overcome inertia of the coupler pins, said pins operating to connect and disconnect the slidable carriers to the said rotating means.

10. A braiding machine comprising an inner turret having an upwardly and outwardly inclined outer face, an outer turret surrounding said inner turret and formed with an upwardly and outwardly inclined guiding track at its upper end, said track being radially slotted and the inner face of said outer turret lying close to and parallel with the outer face of the inner turret, a series of carrier heads mounted on said track, a series of bobbins supported by said carrier heads and extending outwardly and downwardly therefrom, a series of coupler pins carried by the inner turret and adapted to alternately connect the carrier heads with said inner turret, an undulating annular groove being formed in the inner wall of the outer turret, projections on the coupler pins extending into said groove and serving to cause said pins to reciprocate to bring them into and out of engagement with the carrier heads as said pins and carrier heads pass the slots in said guiding track, and means for rotating the turrets in opposite directions.

11. A braiding machine comprising an inner turret having an upwardly and outwardly inclined outer face, an outer turret surrounding said inner turret and formed with an upwardly and outwardly inclined guiding track at its upper end, said track being radially slotted and the inner face of said outer turret lying close to and parallel with the outer face of the inner turret, a series of carrier heads mounted on said track, a series of bobbins supported by said carrier heads and extending outwardly and downwardly therefrom, a series of coupler pins carried by the inner turret and adapted to intermittently connect the carrier heads with said inner turret, an undulating annular groove being formed in the inner wall of the outer turret, projections on the coupler pins extending into said groove and serving to cause said pins to reciprocate to bring them into and out of engagement with the carrier heads as said pins and carrier heads pass the slots in said guiding track, means for rotating the turrets in opposite directions, and resilient elements connected to the coupler pins and to the inner turret to cause said pins to vibrate in synchronism with the undulations in the said groove.

12. A braiding machine comprising an inner turret having an upwardly and outwardly inclined outer face, an outer turret surrounding said inner turret and formed with an upwardly and outwardly inclined guiding track at its upper end, said track being radially slotted and the inner face of said outer turret lying close to and parallel with the outer face of the inner turret, a series of yoke-like carrier heads slidably mounted on and embracing the upper part of the guiding track, a bobbin supported by the outer member of each of said yoke-like heads and extending outwardly and downwardly therefrom, a series of coupler pins carried by the inner turret and moving on the inner surface of the outer turret and adapted to be alternately connected to and disconnected from the inner member of the yoke-like carrier heads, an undulating annular groove being formed in the inner wall of the outer turret, projections on the coupler pins extending into said groove and serving to cause said pins to reciprocate, and means for rotating the turrets in opposite directions.

13. A braiding machine comprising an inner turret, an outer turret the upper end of said outer turret extending upwardly and outwardly to form a guiding and supporting track, an inner series of carriers mounted on said track and extending outwardly and downwardly therefrom, means for intermittently connecting said carriers to the inner turret to permit the threads from the outer bobbins to pass under said inner carriers, a series of thread bobbins mounted on the outer turret, a stationary guide ring, a series of adjustable thread guides mounted on said ring and between the outer bobbins and the inner series of carriers and adapted to cause the threads from the outer bobbins to pass over the inner series of carriers, rigid thread guides mounted on the outer turret and moving with the outer series of bobbins and directing the threads from said bobbins under the inner series of carriers, and shuttles mounted on the outer ends of the inner series of carriers and serving to assist in guiding the threads from the outer bobbins over and under the inner series of carriers.

14. A braiding machine comprising an inner series of carriers, means for supporting said carriers at their upper ends said carriers extending outwardly and downwardly from their supporting means, a substantially elliptical shuttle plate secured to the outer lower end of each of said carriers, means for rotating said inner series of carriers, an outer series of bobbins, means for rotating said bobbins around the machine opposite to the direction of rotation of the inner carriers, a stationary guide ring, a series of thread-guide cams individually adjustable around said ring and adapted to cause the threads from the outer bobbins to pass over the shuttle plates of the inner series of carriers and rigid thread guides mounted to move with the outer series of bobbins and directing the threads from said bobbins under the shuttle plates of the inner series of carriers.

15. A braiding machine comprising an inner series of carriers, means for supporting said carriers at their upper ends said carriers extending outwardly and downwardly from their suporting means, a substantially elliptical shuttle plate secured to the outer lower end of each of said carriers, means for rotating said inner series of carriers, an outer series of bobbins, means for rotating said bobbins around the machine opposite to the direction of rotation of the inner carriers, rigid thread guides mounted to move with the outer series of bobbins each being formed with a thread-receiving notch below the horizontal centers of the shuttle plates and adapted to receive the threads from the outer bobbins and direct them under the shuttle plates of the inner series of carriers, a stationary guide ring, and a series of thread-guide cams individually adjustable around said ring and formed with an inclined thread-guiding surface adapted to engage the threads and lift them out of the notches in the said rigid guides and direct them over the shuttle plates of the inner series of carriers.

16. A braiding machine comprising an inner turret having an upwardly and outwardly inclined outer face, an outer turret surrounding said inner turret and formed with an upwardly and outwardly inclined guiding track at its upper end, said tack being radially slotted and the inner face of said outer turret lying close to and parallel with the outer face of the inner turret, a series of yoke-like carrier heads slidably mounted on and embracing the upper part of the guiding track, a bobbin supported by the outer member of each of said yoke-like heads and extending outwardly and downwardly therefrom, a pair of coupler pins for each of said carrier heads, all of said pins being carried by the inner turret and moving on the inner surface of the outer turret, an undulating annular groove being formed in the inner wall of the outer turret adjacent said pins, projections on the coupler pins extending into said groove and serving to cause said pins to reciprocate as the turrets move in opposite directions, and means for rotating the turrets in opposite directions.

17. A braiding machine comprising an inner turret, an outer turret the upper end of said outer turret extending upwardly and outwardly to form a guiding and supporting track, an inner series of carriers mounted on said track and extending outwardly and downwardly therefrom, means for alternately connecting said carriers to the inner turret to permit the threads from the outer bobbins to pass under said inner carriers, a series of thread bobbins mounted on the outer turret, a stationary guide ring, a series of adjustable thread guides mounted on said ring and between the outer bobbins and the inner series of carriers and adapted to guide the threads from the outer bobbins, rigid thread guides mounted on the outer turret and moving with the outer series of bobbins and directing the threads from said bobbins, one of said two series of thread guides causing the threads from the outer bobbins to pass over the inner series of carriers and the other causing the said threads to pass under the inner series of carriers, and shuttles mounted on the outer ends of the inner series of carriers and serving to assist in guiding the threads from the outer bobbins over and under the inner series of carriers.

18. A braiding machine comprising a series of bobbin carriers, a guiding and supporting track on which said carriers are adapted to move, a rotating means, coupler means carried by said rotating means, means for imparting reciprocating impulses to the coupler means, and resilient means connected to said coupler means and tuned to synchronize with said reciprocating impulses and thereby overcome inertia of the coupler means said means operating to connect and disconnect the slidable carriers to the said rotating means.

19. A braiding machine comprising an inner series of carriers, means for supporting said carriers, means for rotating said inner series of carriers, an outer series of bobbins, means for moving said outer series of bobbins around the machine opposite to the direction of movement of the inner carriers, a stationary guide ring, a series of thread guide cams individually adjustable around the said ring and adapted to cause the threads from the outer bobbins to pass over the inner series of carriers, and rigid thread guides mounted to move with the outer series of bobbins and directing the threads from said bobbins under the inner series of carriers.

20. A braiding machine comprising an inner series of carriers, means for supporting said carriers, means for rotating said inner series of carriers, an outer series of bobbins, means for moving said outer series of bobbins around the machine opposite to the direction of movement of the inner carriers, and a series of thread guide cams individually adjustable and adapted to cause the threads from the outer bobbins to pass over the inner series of carriers.

In testimony whereof I hereunto affix my signature.

FREDERICK KLEIN.